United States Patent [19]

Nio et al.

[11] Patent Number: 4,677,276
[45] Date of Patent: Jun. 30, 1987

[54] METHOD OF WELDING ROBOT CONTROL WHICH CONTROLS THE THREE BASIC AXES OF A ROBOT TO PROVIDE A REPETITION OF A WEAVING PATTERN ALONG A ROBOT LOCUS

[75] Inventors: Satoru Nio, Kitakyushu; Toyoji Hamashima, Nakama; Shinobu Sato, Kitayushu, all of Japan

[73] Assignee: Yaskawa Electric Mfg. Co., Ltd., Kitakyusu, Japan

[21] Appl. No.: 432,748

[22] Filed: Nov. 23, 1982

[51] Int. Cl.$^4$ .............................................. B23K 9/12
[52] U.S. Cl. ............................ 219/125.12; 318/574; 901/42
[58] Field of Search ............ 219/125.1, 125.12, 125.11; 318/569, 574; 901/42

[56]  References Cited
U.S. PATENT DOCUMENTS 4,150,329  4/1979  Dahlstrom .......................... 318/569

*Primary Examiner*—Clifford C. Shaw
*Attorney, Agent, or Firm*—Jordan and Hamburg

[57] ABSTRACT

A method of controlling a welding robot substantially comprises (i) teaching three points in the neighborhood of a teaching line to define a weaving pattern, and (ii) controlling three basic axes of a welding robot so that a welding torch tip of the robot moves on one of the surfaces of a triangular pillar formed by shifting a triangular plane defined by the above three points along the teaching line, while executing a weaving operation which is determined by a weaving amplitude, a weaving frequency, and a welding velocity. After continuing the above movement until the torch tip arrives at the end point of the teaching line, the weaving operation along the next teaching line is effected utilizing a new triangular plane which is formed by rotating the former triangular plane on an axis defined by the former teaching line and the next teaching line. By utilizing and repeating such rotation, there is no need to teach a weaving pattern at each teaching line and an operator can easily teach the welding pattern with any complex weaving pattern.

2 Claims, 5 Drawing Figures

METHOD OF WELDING ROBOT CONTROL WHICH CONTROLS THE THREE BASIC AXES OF A ROBOT TO PROVIDE A REPETITION OF A WEAVING PATTERN ALONG A ROBOT LOCUS

THE BACKGROUND OF INVENTION

This invention relates to a welding robot controlling method, and more particularly to the method which provides an accurate weaving operation and automatic continuation of the weaving pattern throughout the full automatic welding.

As the method for realizing the weaving of a torch (a weaving operation) along a teaching line (welding line) of a robot, U.S. Pat. No. 4,188,525 and Japanese laid-open publication 56-89379 disclose one method, wherein for moving the center of the weaving exactly on the teaching line, repeating signals for the weaving operation are superposed on positional input signals given to positional servo circuits of respective drive axes of the welding robot. However, since this conventional method uses an oscillator and a signal memory element as repeating signals for the weaving operation, when the teaching line varies three-dimensionally at will, no accurate weaving patterns can be obtained. This can be readily understood by considering the nature of such repeating signals. Namely, since the repeating signals have a constant amplitude and frequency, it is not accurate in the case in which the teaching line of articulated robots, polar coodinate robots, or cylindrical coordinate robots is a straight line. As an example, in an articulate robot which moves the welding torch tip linearly as a combined movement of the drive axes, the linear movement of the torch becomes possible only with the combined control of the respective drive axes, and the positional input signals given to the positional servo circuit of the drive axes are not constant signals of either a ramp input or a step input, but are the complicated signals which vary every moment corresponding to the varying position of the robot.

To obtain a desired weaving pattern, the weaving repeating signals, which are to be superimposed on the complicated positional signals given to the respective drive axes, should vary in a complicated manner corresponding to the varying positions of the robot. The realization of such complicated varying of the weaving signals is not possible with a simple oscillator. On the other hand, to memorize such complicated weaving repeating signals as the positioning commands to the positional servo circuits of the respective drive axes utilizing the signal memory element requires an impractically large amount of storage capacity. A particularly novel method which improves these defects is proposed in U.S. Pat. No. 4,150,329. The proposed method consists in obtaining incremental displacements in three-dimensional space along X, Y and Z axes every constant period (in general, a short time of an order of milliseconds) by composing programming data which represent the principal movement along a plurality of teaching lines, and other programming data which represent a weaving movement (subordinate movement) without any displacement along the teaching lines. Although such prior art developments produce satisfactory weaving movement along one teaching line, the system is relatively complex and falls short of the present invention in providing flexibility and performance in continuous generation of weaving movements along a plurality of teaching lines.

When a robot locus which consists of a multiplicity of teaching lines is to be traced by the weaving operations, the teaching operation is required for seeking the amplitude and the frequency of the weaving repeating signals on each teaching line, whereby the operability of the teaching operation as a whole becomes extremely low.

Accordingly, it is an object of the present invention to provide a weaving control method which can overcome the above defects of the conventional methods.

The weaving control method of this invention provides that by controlling the three basic axes of a robot, a desired weaving operation is accurately executed on any teaching line.

The weaving control method of this invention is substantially characterized in that when a robot locus consisting of a multiplicity of teaching lines is to be traced by the weaving operation, by designating on the first teaching line three points which define the weaving pattern, an accurate weaving operation is obtained also on the successive teaching lines.

DETAILED DESCRIPTION OF DISCLOSURE

The welding robot controlling method of this invention is hereinafter disclosed in view of an embodiment shown in the attached drawings.

Figure 1:
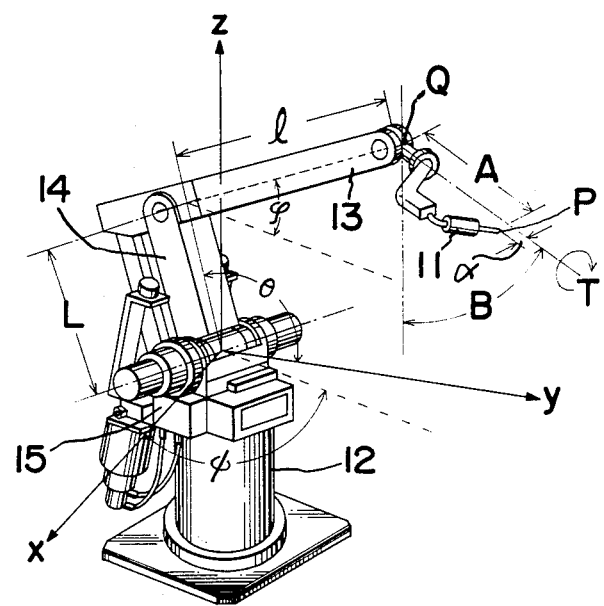
FIG. 1 is a perspective view of an arc welding robot embodying the present invention.

FIG. 1 shows an exemplary articulated teaching playback robot which is suitable for applying the control method of the present invention, in which a consumable electrode welding torch is indicated at 11.

This welding robot includes a turning unit 15 having two articulated arms 13 and 14 and being rotatably mounted on a stand 12. The bending angle and the turning angle of the welding torch 11 attached to the arm 13 can be changed by means of driving motors. The welding torch 11 is caused to perform weaving motion by controlling the motions of three basic axes of the robot, namely the arms 13 and 14 and the turning unit 15.

Although the embodiment is described in view of an articulated robot for convenience, the method is applicable to other types of robots, such as polar coordinate robots, cylindrical coordinate robots or orthogonal coordinate robots.

Figure 2:
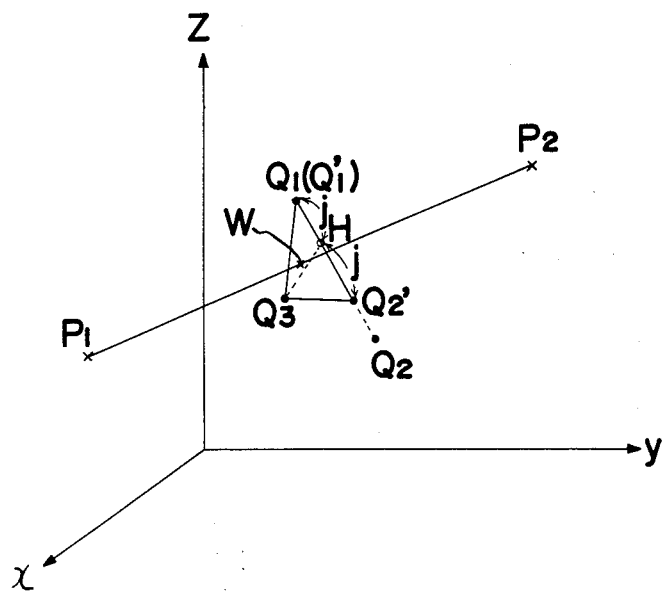
FIG. 2 is an explanatory view of teaching positions for defining the weaving motion.

Referring to FIG. 2, the weaving motion effected by the three basic axes of the robot will be described below.

Prior to the operation of the robot, it is necessary to teach the conditions required for welding, such as weaving direction, weaving amplitude, and weaving frequency, to the robot.

The weaving direction and weaving amplitude are set by teaching desired three points $Q_1$, $Q_2$ and $Q_3$ between teaching points $P_1$ and $P_2$. The point $Q_3$ is provided because the weaving plane cannot be determined only with the two points $Q_1$ and $Q_2$. For providing a weaving amplitude which will be taught separately, a perpendicular is drawn from the point $Q_3$ to a line $\overline{Q_1Q_2}$ to determine the foot H of the perpendicular and points $Q_1'$ and $Q_2'$ which meet the condition $\overline{Q_1'H} = \overline{HQ_2'} = J$ are sought on the extension line of $\overline{Q_1Q_2}$. The simple harmonic weaving motion of the same amplitude with respect to the center H of weaving is effected along a course of $H \to Q_1' \to H \to Q_2'H$. In the following explanation, $Q_1'$ is considered equal to $Q_1$, that is, $Q_1 = Q_1'$ as shown in FIG. 2. Provided that:

$$P_1(\bar{x}_1, \bar{y}_1, \bar{z}_1),\ P_2(\bar{x}_2, \bar{y}_2, \bar{z}_2),\ P_3(\bar{x}_3, \bar{y}_3, \bar{z}_3), \quad (1)$$
$$Q_1(x_1, y_1, z_1),\ Q_2(x_2, y_2, z_2),\ Q_3(x_3, y_3, z_3),$$

and $$(\alpha, \beta, \gamma) \ldots \text{the direction cosine of } \overline{Q_1Q_2} \quad (2)$$

$$(\alpha', \beta', \gamma') \ldots \text{the direction cosine of } \overline{Q_1Q_3}$$

$$(\lambda, \mu, \nu) \ldots \text{the direction cosine of } \overline{P_1P_2}$$

the coordinates $(x_w, Y_w, z_w)$ of a point W of intersection between the plane defined by points $Q_1$, $Q_2$ and $Q_3$ and the line $P_1P_2$ are determined to:

$$x_w = f_1(x_1, y_1, z_1, \bar{x}_1, \bar{y}_1, \bar{z}_1, \alpha, \beta, \gamma, \alpha', \beta', \gamma', \lambda, \mu, \nu) \quad (3)$$

$$y_w = f_2(x_1, y_1, z_1, \bar{x}_1, \bar{y}_1, \bar{z}_1, \alpha, \beta, \gamma, \alpha', \beta', \gamma', \lambda, \mu, \nu)$$

$$z_w = f_3(x_1, y_1, z_1, \bar{x}_1, \bar{y}_1, \bar{z}_1, \alpha, \beta, \gamma, \alpha', \beta', \gamma', \lambda, \mu, \nu)$$

where the symbols $f_1, f_2$ and $f_3$ represent functional equations $P_1$, $_2$,$P_3$,$Q_1$,$Q_2$ and $Q_3$ are teaching points and their coordinates are known. Therefore, the values $\alpha$, $\beta$, $\gamma$, $\alpha'$, $\beta'$, $\gamma'$, $\lambda$ and $\nu$, namely the values of $x_w, Y_w, Z_w$, can easily be obtained by means of a micro processor.

Although the center of weaving is H, the center of weaving is represented by the intersection W in this description to facilitate understanding. This center W of weaving moves on a teaching line $\overline{P_1P_2}$ in FIG. 2. The welding torch tip mounted on the robot wrist does not follow the locus of the point W, but follows a locus given by adding a vector WH and an instant weaving distance from the point H to the varying coordinate values of W.

In order to obtain the coordinates of the weaving point of the welding torch tip during K clock pulses after the welding torch tip has started from the point H, a distance S which the welding torch tip moves on within the period of one reference clock pulse along the line $\overline{Q_1Q_2'}$ is obtained.

$$S = 4hjC_o \quad (4)$$

where $C_o$ is the period of the reference clock pulse and h is the frequency of weaving motion.

$\Delta x$, $\Delta y$ and $\Delta z$ which are the x,y,z components of the distance S are represented by the following equations respectively:

$$\alpha x = -S\alpha,\ \Delta y = 31\ S\beta\ \text{and}\ \Delta z = -S\gamma \quad (5)$$

The instant coordinates $x_k, Y_k$, and $z_k$ on the weaving pattern after K reference clock pulses is represented by equations as follows:

$$\overline{x_k} = k \cdot \Delta x,\ \overline{y_k} = k \cdot \Delta y,\ \overline{z_k} = k \cdot \Delta z \quad (6)$$

when the welding torch tip returns at points $Q_1$ and $Q_2'$ during the weaving motion through $H \to Q_1 \to H \to Q_2' \to H$, naturally, the signs of $\Delta x$, $\Delta y$ and $\Delta z$ are inverted.

The length and direction of vector $\overline{WH}$ are always constant and the components of the vector $\overline{WH}$, $x_o, y_o$ and $z_o$ are represented by equations as follows:

$$x_o = x_1 + j\alpha - x_w,\ y_o = y_1 + j\beta - y_w,\ z_o = z_1 + j\gamma - z_w \quad (7)$$

Thus, the welding torch tip follows a locus given by adding the coordinates of the center W of weaving to Equations (6) and (7).

Provided that the welding speed is V, the amount of movement of the center W of weaving at each reference clock pulse as the center moves on $\overline{P_1P_2}$ is expressed by:

$$\bar{x}_{no} = \frac{(\bar{x}_2 - \bar{x}_1)C_oV}{\sqrt{(\bar{x}_2 - \bar{x}_1)^2 + (\bar{y}_2 - \bar{y}_1)^2 + (\bar{z}_2 - \bar{z}_1)^2}} \quad (8)$$

$$\bar{y}_{no} = \frac{(\bar{y}_2 - \bar{y}_1)C_oV}{\sqrt{(\bar{x}_2 - \bar{x}_1)^2 + (\bar{y}_2 - \bar{y}_1)^2 + (\bar{z}_2 - \bar{z}_1)^2}}$$

$$\bar{z}_{no} = \frac{(\bar{z}_2 - \bar{z}_1)C_oV}{\sqrt{(\bar{x}_2 - \bar{x}_1)^2 + (\bar{y}_2 - \bar{y}_1)^2 + (\bar{z}_2 - \bar{z}_1)^2}}$$

The distance that the center W of weaving moves in K times of reference clock pulses is expressed by:

$$x_k' = \bar{x}_1 + \overline{x_{no}} \cdot k$$

$$y_k' = \bar{y}_1 + \overline{y_{no}} \cdot k \quad (9)$$

$$z_k' = \bar{z}_1 + \overline{z_{no}} \cdot k$$

When the coordinates $(x_k, y_k, z_k)$ of the welding torch tip are controlled such that the coordinates are expressed by following equations, a desired weaving pattern is obtained.

$$x_k = x_k' + x_k + x_o$$

$$y_k = y_k' + y_k + y_o \quad (10)$$

$$z_k = z_k' + z_k + z_o$$

The control of the robot wrist axes well be described below.

The wrist postures must be controlled so that the torch angle and the advancing angle with respect to the weld line are within the respective ranges of variation which are dependent on the welding conditions. Naturally, the wrist postures at the teaching points $P_1$ and $P_2$ are correctly taught. The increments $\alpha B$ and $\alpha T$ per one reference clock $C_o$ are determined by:

$$\Delta B = \frac{(\bar{B}_2 - \bar{B}_1) \cdot V \cdot C_o}{\sqrt{(\bar{x}_2 - \bar{x}_1)^2 + (\bar{y}_2 - \bar{y}_1)^2 + (\bar{z}_2 - \bar{z}_1)^2}} \quad (11)$$

-continued $$\Delta T = \frac{(\bar{T}_2 - \bar{T}_1) \cdot V \cdot C_o}{\sqrt{(\bar{x}_2 - \bar{x}_1)^2 + (\bar{y}_2 - \bar{y}_1)^2 + (\bar{z}_2 - \bar{z}_1)^2}}$$

where $\bar{B}_1$, $\bar{T}_1$, $\bar{B}_2$, and $\bar{T}_2$ are the values of wrist bending angle B and a wrist turning angle T at the points $P_1$ and $P_2$, respectively.

Accordingly, $B_k$ and $T_k$ in K times of reference clock are controlled to take following values;

$$B_k = \bar{B}_1 + \Delta B \cdot K \qquad (12)$$
$$T_k = \bar{T}_1 + \Delta T \cdot K$$

whereby the welding torch can constantly hold the desired position even in the weaving operation.

The values X, Y and Z of Equation (1) represent the values of the control point, namely the welding torch tip. In order to establish the Equation (1), it is necessary to convert the stored coordinate data of the driving axes of the points $P_1$, 2, $Q_1$, $Q_2$ and $Q_3$ into data of orthogonal coordinates, irrespective of the types of the robot, i.e. the Cartesian coordinate robot, articulated robot, cylindrical coordinates robot or polar coordinates robot.

The solution $X_k$, $Y_k$ and $Z_k$ of the Equation (10) have to be inverted to the drive axis data of the three basic axes of the robot in order to realize the correct position of the welding torch $(X_k, Y_k, Z_k, B_k, T_k)$ at every reference clock pulse using Equations (10) and (12). The data of the robot wrist axes comprises the bending angle $B_k$ and the turning angle $T_k$.

The three basic axes, namely, the axes of the swiveling unit 15 and arms 13 and 14, of the robot embodying the present invention as shown in FIG. 1, are controlled by the respective angles of rotation $\psi$, $\theta$ and $\phi$, while the wrist bending axis and the wrist turning axis are controlled by angles of rotation B and T, respectively. The control point P is the tip of the welding torch 11.

Since the point P which is apart from the center of the wrist bending axis by a distance A and the center of the wrist turning axis by a distance d respectively, is the control point which has previously been taught, the orthogonal coordinates of the point are expressed:

$$X = (L\cos\theta + l\cos\phi + A\sin B + d\cos T \cdot \cos B)\cos\psi - d\sin T \cdot \sin\psi$$
$$Y = (L\cos\theta + l\cos\phi + A\sin B + d\cos T \cdot \cos B)\sin\psi + d\sin T \cdot \cos\psi \qquad (13)$$
$$Z = L\sin\theta + l\sin\phi - A\cos B + d\cos T \cdot \sin B$$

The angles of rotation $\psi_k$, $\theta_k$ and $\phi_k$ of the three basic axes of an articulated robot are determined by the following equations produced by inverting Equation (13) using $X_k, Y_k$ and $Z_k$ determined by Equation (10) and $B_k$ and $T_k$ determined by Equation (12):

$$\psi_k = f_{13}(X_k, Y_k, Z_k, B_k, T_k)$$
$$\theta_k = f_{14}(X_k, Y_k, Z_k, B_k, T_k) \qquad (14)$$
$$\phi_k = f_{15}(X_k, Y_k, Z_k, B_k, T_k)$$

Equations (13) and (14) are defined according to the type of the robot.

Figure 3:
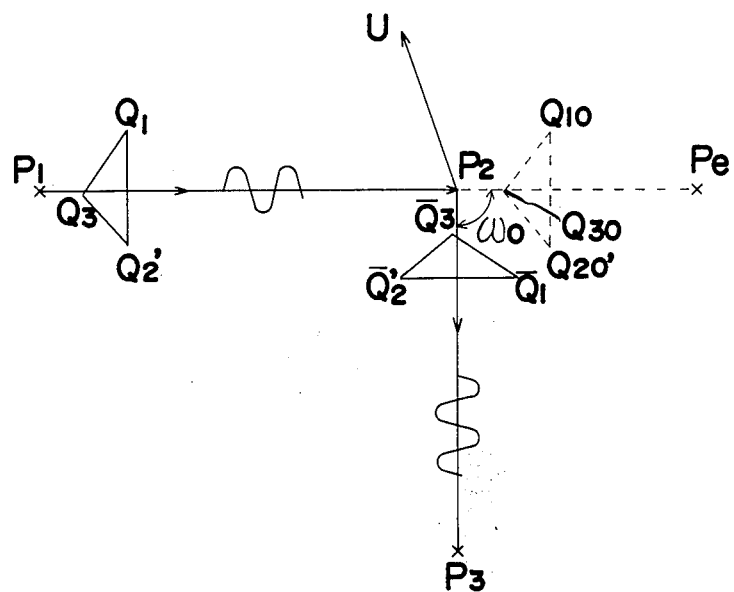
FIG. 3 is an explanatory view of the automatic continuation of a weaving pattern.

FIG. 3 is a view to facilitate the explanation of the automatic continuation of a weaving teaching pattern. Referring to FIG. 3, the points $P_1$, $P_2$ and $P_3$ are teaching points similar to those of FIG. 2, while the meaning of the points $Q_1$, $Q_2'$ and $Q_3$ is the same as those of FIG. 2.

A point Pe is determined on the extension of a line $P_1P_2$. When the point $P_1$ and a triangle $\Delta Q_1Q_2'Q_3$ are parallel shifted along the line $P_1P_2$ with the fixed relationship therebetween until the point $P_1$ coincides with the point $P_2$, the line $Q_1Q_2'$ is brought to superpose a line $Q_{10}Q_{20}'$. A line $P_2U$ is drawn perpendicularly to a plane defined by lines $P_2P_3$ and $P_2Pe$, in which the line $\overline{P_2U}$ is drawn in a direction of a vector product of vectors $P_2P_3$ and $P_2Pe$. The weaving pattern $\overline{Q_1Q_2'}$ of the next step is obtained when line $\overline{Q_{10}Q_{20}'}$ is turned about the axis of $P_2U$ in the direction from the line $\overline{P_2Pe}$ to the line $\overline{P_2P_3}$ through an angle $<P_3P_2Pe = \omega$.

The direction cosine $(\lambda, \mu, \nu)$ of the line $\overline{P_1P_2}$ is determined by the coordinates of points $P_1(\bar{x}_1, \bar{y}_1, \bar{z}_1)$ and $P_2(\bar{x}_2, \bar{y}_2, \bar{z}_2)$, while the direction cosine $(\lambda', \mu', \nu')$ of the line $\overline{P_2P_3}$ is determined by the coordinates of points $P_2(\bar{x}_2, \bar{y}_2, \bar{z}_2)$ and $P_3(\bar{x}_3, \bar{y}_3, \bar{z}_3)$. Accordingly, the angle $\omega_o$ is expressed by:

$$\omega_o = f_{16}(\lambda, \mu, \nu, \lambda', \mu', \nu') \qquad (15)$$

when the coordinates of the points $Q_1, Q_2'$ and $Q_3$ are $(x_1, y_1, z_1)$, $(x_2, y_2, z_2)$ and $(x_3, y_3, z_3)$, respectively, $\overline{Q_1}(x_1', y_1', z_1')$ is defined by the following equation:

$$x_1' = f_{17}(\bar{x}_1, \bar{x}_2, x_1, y_1, z_1, \psi_o, \lambda, \mu, \nu, \lambda', \mu', \nu')$$
$$y_1' = f_{18}(\bar{y}_1, \bar{y}_2, x_1, y_1, z_1, \psi_o, \lambda, \mu, \nu, \lambda', \mu', \nu') \qquad (16)$$
$$z_1' = f_{19}(\bar{z}_1, \bar{z}_2, x_1, y_1, z_1, \psi_o, \lambda, \mu, \nu, \lambda', \mu', \nu')$$

$\overline{Q_2'}(x_2', y_2', z_2')$ and $\overline{Q_3}(x_3', y_3', z_3')$ also are obtained in the similar manner. The teaching of the weaving pattern and the amplitude is required to be effected only once with respect to the initial weld line. In the succeeding step, the weaving is automatically continued along the respective correct directions by sequentially obtaining $\overline{Q_1, Q_2'}$ and $\overline{Q_3}$ and repeating the procedure described with reference to FIG. 2. Even if a step having an air-cut, where the weaving is interrupted, is included in the successive step, the above-mentioned computing is continued. Therefore, the teaching of weaving points $Q_1, Q_2$ and $Q_3$ is unnecessary in the weld line even after the air-cut. That is, only one teaching of the weaving points $Q_1$, $Q_2$ and $Q_3$ is sufficient.

Figure 4:
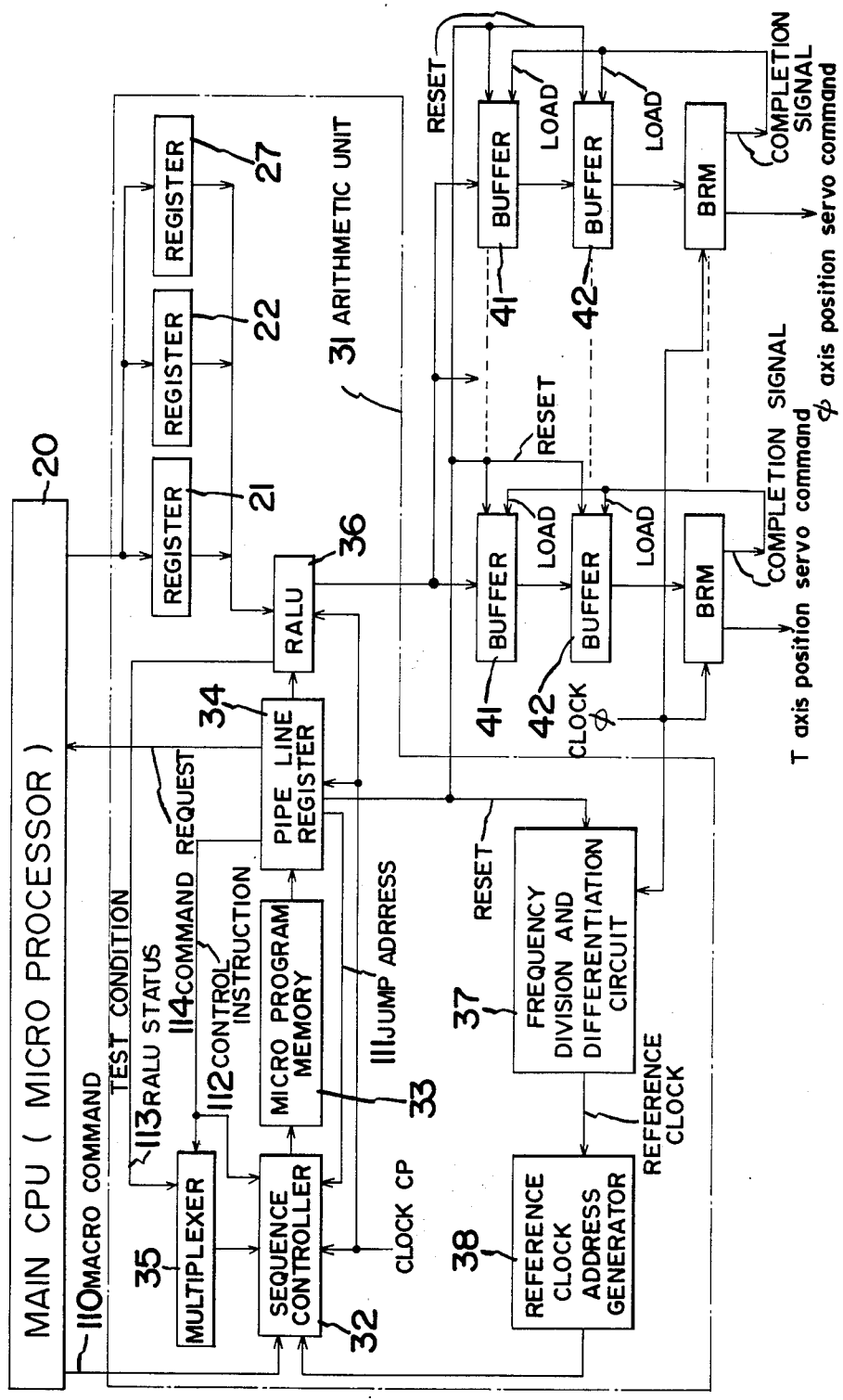
FIG. 4 is a block diagram of an embodiment of the control circuit in accordance with the present invention.

FIG. 4 is a block diagram showing the connection of servo controllers for positioning of robot drive axes which consist of BRMs having two-stage buffers, an arithmetic unit which embodies the present invention and a main CPU (micro processor) for generally controlling the general robot operation.

To effect the weaving welding operation through the general sequential robot motion, the main CPU 20 has functions to read out the following data, (a) the respective number of pulses of the start position $P_1$ and the end position $P_2$ to be weaved, (b) the weaving pattern defining positions $Q_1, Q_2$ and $Q_3$ which are specified in a teach box (not shown) from the original point of the robot three basic axes and the robot wrist axes, (c) the welding speed V and the weaving frequency h from a memory unit (not shown) to set the data in registers 21 to 27 and to provide a macrocommand to start weaving welding operation.

The arithmetic unit 31 comprises a sequence controller 32, a microprogram memory 33, a pipe line register 34, a multiplexer 35, a RALU 36 (Register and Arithmetic Logical Unit), registers 21 to 27, a clock $\phi$ dividing and leading edge differentiating circuit 37 and a reference clock address generator 38.

The sequence controller 32 is an address controller which is capable of controlling the execution sequence of micro instructions stored in the memory 33 and is adapted to effect various addressing and stack control in response to the control instructions provided by the pipe line register 34.

More particularly, the sequence controller 32 controls the selection of the jump address which is given by the pipe line register 34, the selection of jump address which is given by the pipe line register 34 in the case of unconditional jump, and stack control during micro subroutine, in the increment of the presently executed address, the selection of address specified by the macrocommand, selection of address specified by the reference clock address generator 38 and the conditional jump corresponding to the test conditions including RALU status.

Three kinds of input information for addressing are provided: the macrocommand from the CPU, the output of the reference clock address generator 38, and the output of the pipe line register 34.

According to a microprogram, namely, the control instruction of the pipe line register 34, the sequence controller 32 selects either one of the three kinds of input information or none of them and the increment of the current address is effected.

As a macrocommand, a weaving start command is prepared.

From the semantics of hardware, these macrocommands and the output of the reference clock address generator 38 are given in the form of indicating the first address of the respective processing microprograms. While these are not applied to the sequence controller, a jump address, a subroutine call address and a current address increment are given from the pipe line register 34.

The microprogram memory 33 is the essential unit of the arithmetic unit 31. All the arithmetic processing is executed in accordance with the instructions of the microprogram.

The pipe line register 34 is a buffer register of the microprogram memory. The pipe line register 34 provides a microinstruction for calculation which is to be currently executed to the RALU 36 and also provides a control instruction for deciding the next microaddress to the sequence controller 32 and the multiplexer 35 and also a jump address, a subroutine call address and a current address increment to the sequence controller 32. When the center of the weaving reaches the ending end P₂ of the step, the pipe line register 34 applies a command request requesting the coordinates data of the next step to the main CPU 20.

The pipe line register 34 is provided for forming two signal paths, making such signal paths parallel and simultaneously progress, reducing the microcycle time and attaining high-speed operation.

One of the paths is the path of a control method connecting the pipe line register 34→sequence controller 32→microprogram memory 33, while the other path is the path of the arithmetic method of the pipe line register 34→RALU 36. The pipe line register 34 is provided for parallel actuating these two paths within the same clock cycle.

Since the next instruction of the microprogram prepared by the path of the control method has already been provided at the input of the pipe line register 34 prior to the rising of the clock CP, high-speed operation equivalent to an operation of zero memory fetch time can be attained.

The multiplexer 35 gives the sequence controller 32 test conditions of the RALU status corresponding to the control instruction of the pipe line register 34 and causes a conditional jump to the respective processing program.

The RALU 36 comprises a logical-arithmetic operation unit and a programmable register and is adapted to execute the operation instruction specified by the microprogram. Incremental pulse number of each drive axis of the robot at every reference clock, which is the result of the calculation is stored in the predetermined register included in the RALU 36.

Registers 21,22,23,24 and 25 store pulse numbers of the three basic robot axes and the robot wrist axes from the original point of the starting position $P_1$, ending position $P_2$, position $Q_1$, position $Q_2$ and position $Q_3$ respectively.

The registers 26 and 27 store the profiling welding speed V and the weaving frequency h respectively. A buffer 41 is a register for storing an increment pulse number which is to be distributed in the next reference clock of each drive axis of the robot. A buffer 42 is a register for storing the increment pulse number being currently distributed. The BRM uniformly and evenly distrubutes the pulse by the number stored in the buffer 42 in pulses which are synchronous with the clock $\phi$ within the reference clock period and provides a distribution completion signal for buffer transfer at every reference clock.

Figure 5:
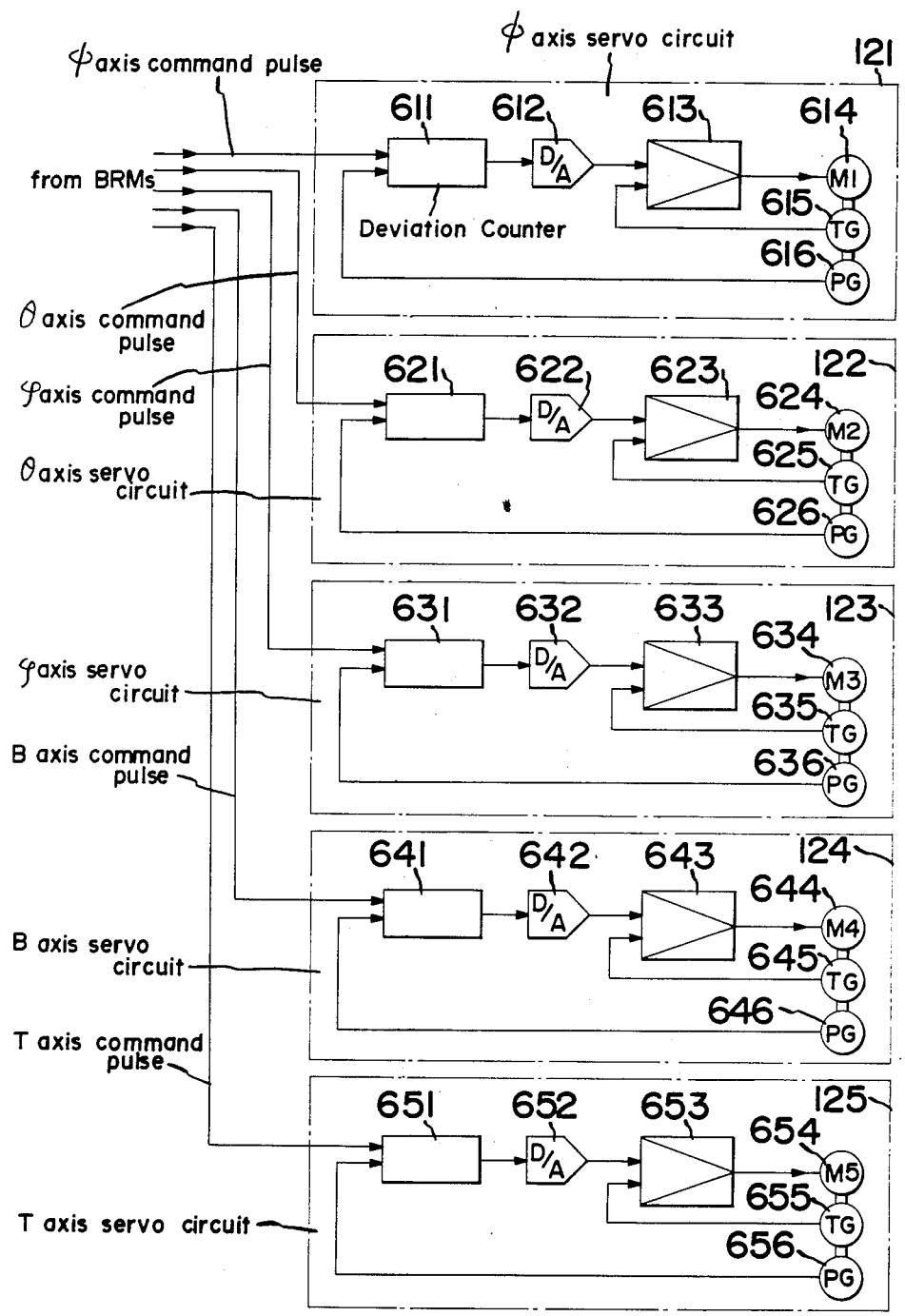
FIG. 5 is a block diagram of an embodiment of the servo control unit in accordance with the present invention.

FIG. 5 shows the positioning servo circuits for the three basic axes ($\psi$-axis, $\theta$-axis, $\phi$-axis) and the two wrist axes (shaft B, shaft T) of an articulated robot which is controlled by the command pulses distributed from the BRM explained with reference to FIG. 4.

Differences between the respective command pulses of the axes which are given to cause the welding torch to perform the weaving motion, and feedback pulses provided by the pulse generators 616,626,636,646 and 656, are provided by deviation counters 611,621,631,641 and 651, then analog speed commands are applied to servo-amplifiers 613, 623, 633, 643 and 653 through D/A converters 612,622,632,642 and 652, respectively. The servoamplifiers compare the speed commands with the output signals (detected speeds) of tachogenerators 615,625,635,645 and 655, respectively, and control the corresponding drive motors so as to cancel the differences between the speed commands and the output signals of the tachogenerators. By means of these positioning servo circuits, the welding torch tip of the robot performs the desired weaving operation in accordance with the command pulses.

The manner of weaving control operation of the control circuit of FIG. 4 is explained below.

Initially, the arithmetic unit 31 executes a wait routine, while receiving a control instruction from the pipe line register 34 to select the first address of the service program according to the macrocommand from the main CPU 20.

Since the wait routine includes a command to reset the reference dividing circuit 37, no reference clock is generated.

Prior to starting the weaving control, the main CPU 20 sets the coordinates of the starting point $P_1(\overline{\psi}_1, \overline{\theta}_1, \overline{\phi}_1, \overline{T}_1, \overline{B}_1)$ of a weaving welding step, the ending point $P_2(\overline{\psi}_2, \overline{\theta}_2, \overline{\phi}_2, \overline{T}_2, \overline{B}_2)$ of the same step, and weaving pattern defining points $Q_1(\psi_1, \theta_1, \phi_1, T_1, B_1)$, $Q_2(\psi_2, \theta_2, \phi_2, T_2, B_2)$ and $Q_3(\psi_3, \theta_3, \phi_3, T_3, B_3)$ in the registers 21 to 25.

The main CPU 20 also sets a welding speed V and a weaving frequency h in the registers 26 and 27.

When the weaving start macrocommand is provided by the main CPU 20, the first address N# of the weaving control service microprogram is selected. Since this program includes a cancellation instruction for the reset signal of the reference clock dividing circuit 37, the dividing circuit 37 starts counting clock $\phi$. Then, the sequence controller 32 operates to perform an addressing which is necessary for arithmetic processing until an output signal is provided by the next reference clock address generator 38.

Next, the weaving control program which starts with N# address will be described.

The positions $P_1, P_2, Q_1, Q_2$ and $Q_3$, which are set in the registers, are converted to the data of the orthogonal coordinates represented by Equation (1) by using Equation (13).

Then, Equations (4) and (5) are solved by using the weaving frequency h which is set in the register (27). Equation (8) is solved by using the welding speed V set in the register (26). Equations (2), (3) and (7) are solved successively.

Equation (11) is solved by using the wrist axis angle at points $P_1$ and $P_2$. The first address storing the processing programs after this is assumed to be M+.

At the first reference clock, Equation (6) is solved with K=1. Using Equations (9) and (7), $X_k, Y_k$ and $Z_k$ of Equation (10) are determined. $B_k$ and $T_k$ are obtained from Equation (12).

The differences $\Delta B$ and $\Delta T$ between the solution $B_k$ and $T_k$ of Equation (12) and the values of $B_k$ and $T_k$ at the preceding reference clock (now $\overline{B}_1$ and $\overline{T}_1$) are set in the predetermined register of the RALU 36.

The values of $\psi_k, \theta_k$ and $\phi_k$ of the three basic axes are obtained by introducing the solutions $X_k, Y_k$ and $Z_k$ of Equation (10) and $B_k$ and $T_k$ into Equation (14) and then, the differences $\Delta\psi, \Delta\theta$ and $\Delta\psi$ between $\psi_k, \theta_k$ and $\psi_k$ and the values of $\psi_k, \theta_k$ and $\phi_k$ (now $\overline{\psi}_1, \overline{\theta}_1$ and $\overline{\psi}_1$) at the preceding reference clock are set in the predetermined register of RALU, and the arithmetic unit 31 stands by.

This standby is different from the wait routine executed while waiting for the macrocommand which is provided by the main CPU 20, but is a routine executed while waiting for the next reference clock address generator output M+, therefore, the dividing circuit 37 will not be reset.

Since the clock $\phi$ and the bit number of the BRM are set so as to provide a reference clock period which is longer than the time required for completing the operations as hereinbefore described, a shortage of the operating time will not occur.

While the arithmetic unit 31 is executing the wait routine while waiting for M+, the BRM provides a distribution completion signal simultaneously with the generation of a reference clock, the predetermined register of the RALU 36 loads the five buffers 41 with the values of $\Delta\psi, \Delta\theta, \Delta\phi, \Delta B$, and $\Delta T$, respectively, and the buffers 42 are loaded with the contents of the buffers 41.

At the first reference clock, the buffers 41 remain cleared, therefore, 0 is loaded in the buffers 42 so that the BRM does not distribute pulses. This reference clock actuates the reference clock address generator 38 and the execution of the microprogram is started from M+ and Equation (6) is determined by introducing K=2 into the equation.

The Equation (9) is solved and the values of $X_k, Y_k$ and $Z_k$ of Equation (10) are determined. The values of $B_k$ and $T_k$ also are determined by using Equation (12). The differences $\Delta B$ and $\Delta T$ between the values of the instant $B_k$ and $T_k$ and the values of the preceding $B_k$ and $T_k$ are set in the predetermined register of the RALU. The values of $\psi_k, \theta_k$ and $\phi_k$ are determined by introducing $X_k, Y_k, Z_k, B_k$ and $T_k$ into Equation (14). The differences $\Delta\psi, \Delta\theta$ and $\Delta\phi$ between the respective values of $\psi_k, \theta_k$ and $\phi_k$ at the instant and the preceding reference clock are set in the predetermined register of the RALU.

After this, the arithmetic unit stands by and waits for the next reference clock generator output M+.

At the next reference clock, the contents of the buffers 41 at the preceding reference clock are loaded in the buffers 42, while the buffers 41 are loaded with the $\Delta\psi, \Delta\theta, \Delta\phi, \Delta T$, and $\Delta B$ at the present reference clock, respectively and the BRM distributes a command pulse to the respective axis positioning servo circuits.

Then, the arithmetic unit determines the values of $\psi_k, \theta_k, \phi_k, T_k$ and $B_k$ at every reference clock and performs positioning servo control on the basis of the differences $\Delta\psi, \Delta\theta, \Delta\phi, \Delta T$ and $\Delta B$, which are differences between the values of $\psi_n, \theta_n, \phi_n, T_n$ and $B_n$ at the present and the preceding reference clocks.

When the center of the weaving reaches the ending point $P_2$ of the step, the arithmetic unit 31 decides the direction of weaving in the next step and executes the weaving pattern continuation processing to provide the same weaving amplitude as that of the preceding step. More specifically the value of $\omega_o$ of Equation (15) is determined from the direction cosine $(\lambda, \mu, \nu)$ of $\overline{P_1P_2}$ and the direction cosine $(\lambda', \mu', \nu')$ of $\overline{P_2P_3}$, which have previously been defermined in the preceding step and the coordinates $(x_1', y_1', z_1')$ of the position $Q_1$ of the next step, that is, the position $Q_1$ explained with reference to FIG. 3 are determined from Equation (16). Similarly, the coordinates of positions $\overline{Q}_2$ and $\overline{Q}_3$ are determined to replace the coordinates of positions $Q_1$, $Q_2$ and $Q_3$ of Equation (1).

After this, the main CPU 20 sets the coordinates of the ending point $P_2$ of this step in the register 21, and then sets the pulse numbers from the origin of the five axes of the robot at the ending position of the next step in the register 22, and gives a weaving starting macrocommand to the arithmetic unit 31. Thereafter, the above operation is repeated.

Furthermore, as the next segment is always put in the double buffers 41 while the buffers distribute the command pulse, the weaving operation is continued from one step to the next step without stopping at the changing point, whereby a smooth weaving operation is realized at the corner point.

As has been described heretofore, the control method of this invention has the following advantages;

(i) By simply designating three teaching points and the weaving amplitude and frequency (usually being designated by key switches), a correct weaving operation can be performed on any welding line in all working areas of the robot.

(ii) Since a weaving pattern used on the first welding line is automatically continued on a second and any subsequent welding lines, specific teaching of the weaving operation on the above second and subsequent welding lines is unnecessary, whereby the operability of the weaving teaching is greatly enhanced and the operability of the welding robot is also greatly improved.

What we claim is:

1. A method for controlling the movement of a torch tip of a welding robot along a locus defined by a plurality of connected teaching-welding lines, said movement of said torch tip being a complex movement which includes the weaving movement of said torch tip and the movement of the torch tip along the teaching-welding line, said complex movement of said torch tip being generated by a complex movement of the three basic axes of said robot, the method comprising the steps of:
   (a) teaching three points in the neighborhood of a teaching-welding line;
   (b) selecting a first teaching-welding line of said plurality of teaching-welding lines as a current teaching-welding line and selecting a triangular plane determined by said three points as a reference triangular plane of the weaving movement relative to the current teaching-welding line;
   (c) moving the torch tip on one of the surfaces of a triangular pillar which is formed by shifting said reference triangular plane along said current teaching-welding line, while moving the torch tip in the direction of the complex movement which includes the weaving movement which is determined by a weaving amplitude and a weaving frequency and the other movement along the current teaching-welding line which is determined by the welding velocity;
   (d) continuing said movement of the torch tip until the intersection of the plane containing said triangular plane and the current teaching-welding line reaches the end of the current teaching-welding line;
   (e) rotating simultaneously the current teaching-welding line and an arbitrary triangular plane which is formed by shifting in a parallel manner said reference triangular plane in the direction of the current teaching-welding line so that the current teaching-welding line and the next teaching-welding line are superimposed on the plane which contains the current teaching-welding line and said next teaching-welding line;
   (f) selecting said next teaching-welding line as the next current teaching-welding line, and selecting the triangular plane which is formed after said rotation as the reference triangular surface of weaving movement relative to said next current teaching-welding line;
   (g) repeating steps (c) to (f) until the intersection of the plane containing the triangular plane and the last current teaching-welding line reaches the end of the last current teaching-welding line.

2. A method for controlling the movement of a torch tip of a welding robot along a locus defined by at least two connected teaching-welding lines, said movement of said torch tip being a complex movement which includes the weaving movement of said torch tip and the movement of the torch tip along the teaching-welding line, said complex movement of said torch tip being generated by a complex movement of the three basic axes of said robot, the method comprising the steps of:
   teaching three points in the neighborhood of a teaching-welding line;
   selecting a first teaching-welding line of said teaching-welding lines as a current teaching-welding line and selecting a triangular plane determined by said three points as a reference triangular plane of the weaving movement relative to the current teaching-welding line;
   moving the torch tip on one of the surfaces of a triangular pillar which is formed by shifting said reference triangular plane along said current teaching-welding line, while moving the torch tip in the direction of the complex movement which includes the weaving movement which is determined by a weaving amplitude and a weaving frequency and the other movement along the current teaching-welding line which is determined by the welding velocity;
   continuing said movement of the torch tip until the intersection of the plane containing said triangular plane and the current teaching-welding line reaches the end of the current teaching-welding line;
   rotating simultaneously the current teaching-welding line and an arbitrary triangular plane which is formed by shifting in a parallel manner said reference triangular plane in the direction of the current teaching-welding line, so that the current teaching-welding line and the next teaching-welding line are superimposed on the plane which contains the current teaching-welding line and said next teaching-welding line;
   selecting said next teaching-welding line as the second current teaching-welding line, and selecting the triangular plane which is formed after said rotation as the reference triangular surface of weaving movement relative to said second current teaching welding line;
   moving the torch tip on one of the surfaces of a triangular pillar which is formed by shifting said reference triangular plane along said second current teaching-welding line, while moving the torch tip in the direction of the complex movement which includes the weaving movement which is determined by the weaving amplitude and the weaving frequency and the other movement along said second current teaching-welding line which is determined by the welding velocity; and
   continuing said movement of the torch tip until the intersection of the plane containing said triangular plane and the second current teaching-welding line reaches the end of the second current teaching-welding line.

* * * * *